July 9, 1957 F. LE VINE ET AL 2,798,948

CHANNEL CONTROL APPARATUS FOR USE WITH A TELEVISION SET

Filed July 6, 1956 6 Sheets-Sheet 1

INVENTOR.
FRANKEL LE VINE
HARRY NADLER
BY
Benj. T. Rauber
ATTORNEY

CHANNEL CONTROL APPARATUS FOR USE WITH A TELEVISION SET

Filed July 6, 1956 6 Sheets-Sheet 2

INVENTOR.
FRANKEL LE VINE
HARRY NADLER
BY
Benj. T. Rauber
ATTORNEY

CHANNEL CONTROL APPARATUS FOR USE WITH A TELEVISION SET

Filed July 6, 1956 6 Sheets-Sheet 3

INVENTOR.
FRANKEL LE VINE
HARRY NADLER
BY
Benj. T. Rauber
ATTORNEY

CHANNEL CONTROL APPARATUS FOR USE WITH A TELEVISION SET

INVENTOR.
FRANKEL LE VINE
HARRY NADLER
BY Benj. T. Rauber
ATTORNEY

CHANNEL CONTROL APPARATUS FOR USE WITH A TELEVISION SET

Filed July 6, 1956 6 Sheets-Sheet 5

INVENTOR.
FRANKEL LEVINE
HARRY NADLER
BY Benj. T. Rauber
ATTORNEY

CHANNEL CONTROL APPARATUS FOR USE WITH A TELEVISION SET

INVENTOR.
FRANKEL LE VINE
HARRY NADLER
BY
Benj. T. Rauber
ATTORNEY

United States Patent Office 2,798,948

Patented July 9, 1957

2,798,948

CHANNEL CONTROL APPARATUS FOR USE WITH A TELEVISION SET

Frankel LeVine, Brooklyn, and Harry Nadler, Rockville Centre, N. Y.

Application July 6, 1956, Serial No. 596,318

22 Claims. (Cl. 250—20)

Our invention relates to apparatus for use with a television set, either of the console or other standard type. It may be used, for example, to control the channel that may be used with an illuminated advertising program, a scrambled and unscrambled paid circuit or for otherwise controlling the circuit that may be used.

When used in connection with an advertising program our invention provides an illuminated display identifying the program of the advertiser or sponsor and showing advertising material to be presented during those periods when his program is on the air. The advertising material is displayed throughout the period of the program without interfering with the program.

The apparatus further provides that only the program of the sponsor, together with his advertising material may be viewed during this period.

The apparatus may be combined with a television set in such manner that no unusual control is imposed in periods when no sponsored program is being shown. A number of programs in successive periods with separate sponsors may be shown.

The invention also contemplates a further arrangement in which the advertisement of a sponsor may be shown bi-weekly and omitted the intervening week.

A still further modification permits the television set to be operated on ordinary circuits and also to be set to operate through a coin box on a special scrambled circuit showing an attraction for which a fee is charged.

In the apparatus of our invention a viewing chamber is provided adjacent the television set as, for example, immediately below, in which a film having a succession of frames showing the sponsors' announcement or advertising is mounted to pass each frame in succession into viewing position relative to a window and a source of illumination. The period in which each frame is thus exhibited is controlled by a timing clock which divides the time into units of, for example, one-half hour each. At the end of each half-hour period a contact tape is advanced to close into a control circuit a feed circuit corresponding to a particular channel and to advance the sponsor's frame into viewing position. All other circuits are open and accordingly only the sponsor's program together with his announcement may be viewed at that time. Where there is no sponsor, a feed circuit may be closed independently of the channel setting and all channels are thereby open to the set.

Thus through the apparatus and its controls the sponsor's announcement is shown at a set period or periods each week at which time the only circuit to the set is through the tuning knob or a selecting switch which is closed only at the sponsor's channel. This circuit acts electromagnetically to connect the power to the set and also acts electromagnetically to supply power to the film advancing motor and then when the sponsor's frame is positioned in viewing position to stop the motor and close a circuit through the source of illumination for the film. The stopping of the frame in position and transferring the power to the light source is occasioned by a control element on the film. This element may be so positioned that its action may be skipped by a switch mechanism in alternate successive cycles of the film advancement when the sponsor's program and announcement is bi-weekly and the film is advanced on a weekly cycle. The principle of the invention using contact control tape with spaced contacts arranged for selected channels and time periods may also be applied to tune into paid scrambled channels, a coin box being inserted in a suitable circuit for this purpose.

The various features of our invention are illustrated, by way of example, in the accompanying drawings in which—

Our invention is composed of two related and cooperative systems. The film system displays, moves and stores the advertising film. The control system governs the selector in a manner such that the television set may be operated in the usual manner except when there is a sponsored program for which space has been purchased on our invention. The control system also governs the movement of the film as will appear as the description progresses.

Figure 2:
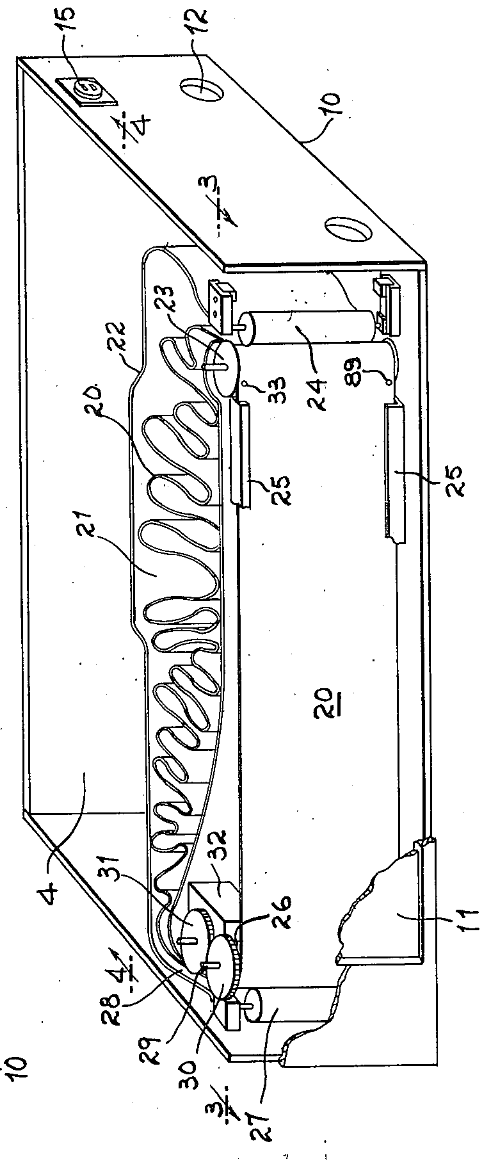
Fig. 2 is a similar perspective of the cabinet with the top and part of the front removed to show the film and its mounting but with the control elements removed.
Figure 1:
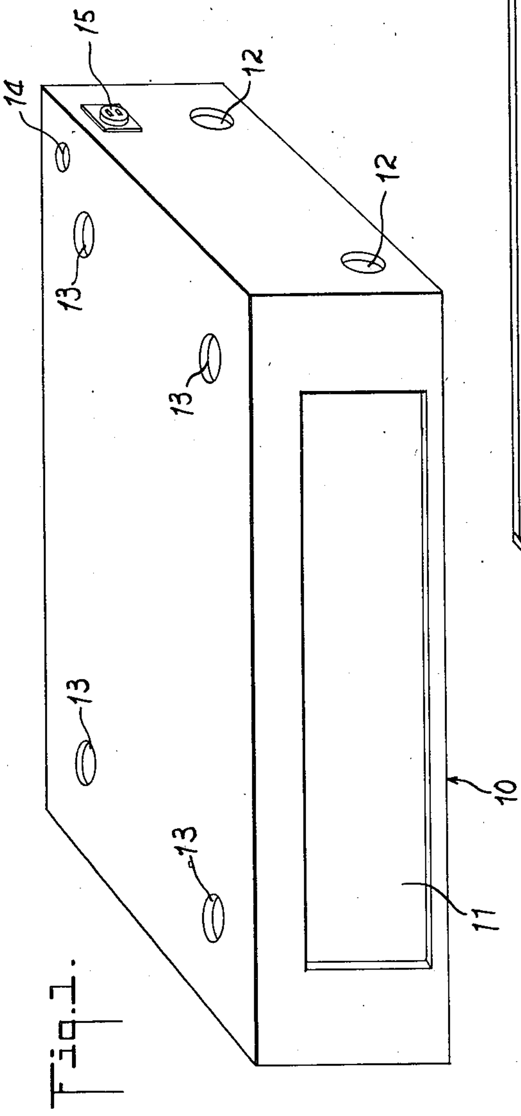
Fig. 1 is a front perspective view of a cabinet for the apparatus of our invention and having a window for viewing the announcement of the sponsors.
Figure 3:
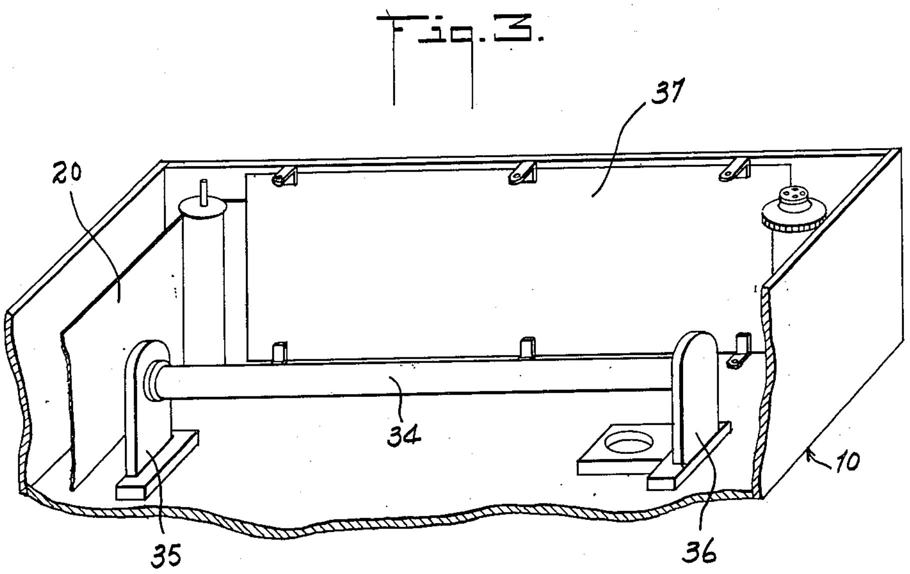
Fig. 3 is a sectional perspective view taken on the line 3—3 of Fig. 2 showing a fluorescent tube as a source of light for the film.

Referring more particularly to Figs. 1, 2 and 3, the film system is mounted in a cabinet 10, in the front wall of which is a window 11, of clear glass or plastic. This cabinet is secured to the base of a commercial television set which rests on top of said cabinet. In the rear and sides of the cabinet are holes for air inlet 12. On top of the cabinet are air outlet holes 13 which coincide with holes in the bottom of the cabinet containing the television set. Electric conductors for supplying current to the television may pass through an opening 14. A socket 15 is provided for a source of electricity to the equipment.

A strip of plastic or photographic film 20, hereinafter referred to as film, Fig. 2, is provided in the cabinet. The width of the film is preferably in excess of the vertical height of the illuminated window 11. The length of film depends upon the number of frames of announcements purchased by sponsors. Each frame sold is of a length slightly greater than the length of the window 11. The total number of frames represents the basic length of the film to which may be added the end lengths for attachment to the reels. A folded projection system using 35 mm. film may be used in place of the wide film illustrated. Such a system, well known to those familiar with the art, is more expensive than the illustrated system.

As shown more particularly in Fig. 2, the film 20 is stored in a storage magazine 21 bounded at its rear by a partition 22. The film rests on its edge and is pushed into one end of the storage magazine 21 and pulled out from the other end. The film 20 is an endless belt and must, therefore, be threaded through the passage provided. The film passes from the right side of the magazine 21 and between the right film roller 23 and pressure roller 24. It then passes behind the clear glass window 11 and between the top and bottom channel guides 25. An alternate method of supporting the film 20 while behind the window 11 is by substituting for guides 25 a white or frosted glass spaced behind the window 11 in a manner to allow room from the film. On the left side the film passes between the film roller 26 and pressure roller 27 and thence into the magazine by way of passage 28. Atop the left hand film roller 26, and mounted on the same shaft 29, is a toothed gear 30 which engages with a similar gear 31 on a drive motor 32. When the motor runs it turns the left film drum 26, which in turn moves the film by friction between the film and the drum 26. Drums 23, 24, 26 and 27 may be covered with a thin sheet of soft latex. In other embodiments of our invention other means are used for driving the film roller 26.

On the top of the film small rivets 33 are placed which operate electric limit switches, or similar devices, in the control system to position the frames. No electric potential is placed across the film. The circuit in which the switch operates is at reduced voltage. The rivets are spaced at distances equal to the length of one frame plus clearance between frames. Recesses in the film rollers 23 and 26 are provided for top and bottom rivets. The pressure rollers 24 and 27 are short and thus do not reach the rivet locations. Otherwise recesses in the pressure rollers 24 and 27 would be required.

Fig. 3 shows one method of illuminating the advertising matter on film 20. A fluorescent tube 34 is mounted between the customary commercial sockets 35 and 36. The use of fluorescent lighting has the distinct advantage of low temperature and therefore small heat input within the cabinet 10. Also the tubes commercially available are 18 and 20 inches long which call for approximately the proper width of cabinet to accommodate the average console radio. In the arrangement shown in Fig. 3 there is shown a wide frosted or white glass plate 37 which extends roughly from top to bottom of the cabinet. This rear glass 37 is spaced rearward of the clear glass window 11, allowing approximately 62 thousandths of an inch opening between the two glass plates, which is ample for film 20.

Figure 4:
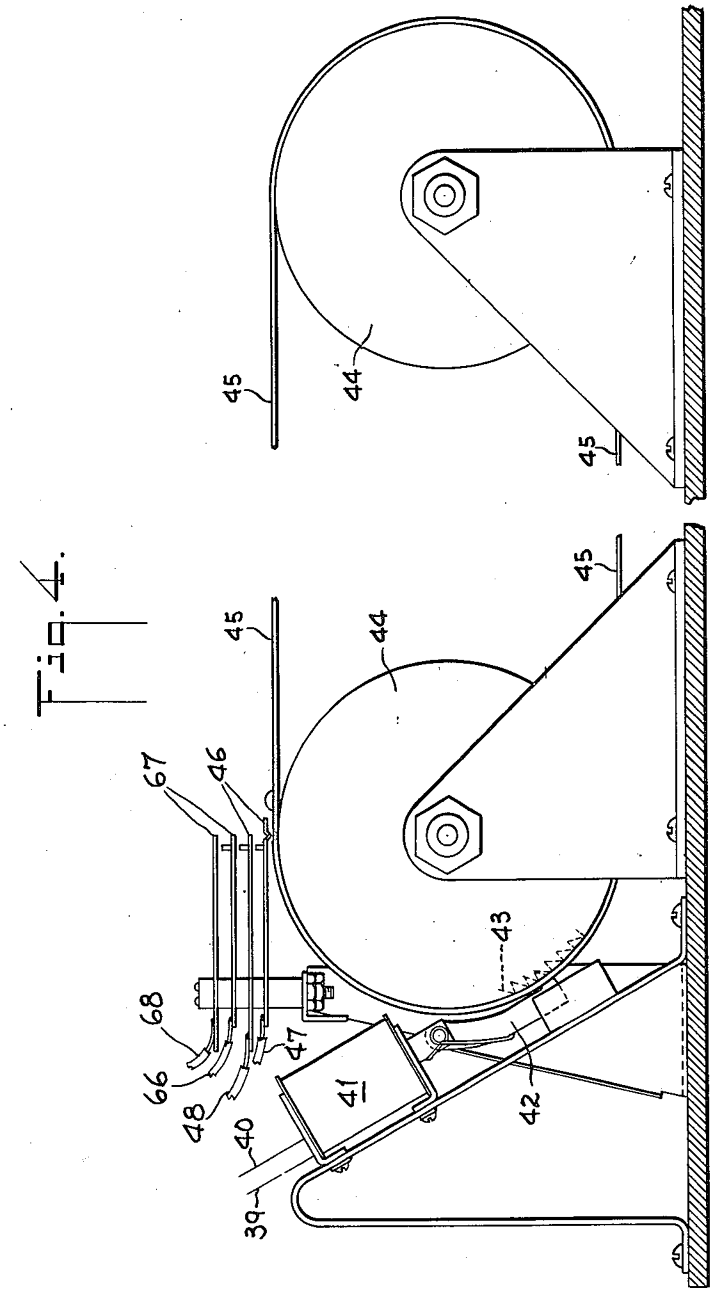
Fig. 4 is an elevation of elements of the control apparatus taken on the line 4—4 of Fig. 2.
Figure 5:
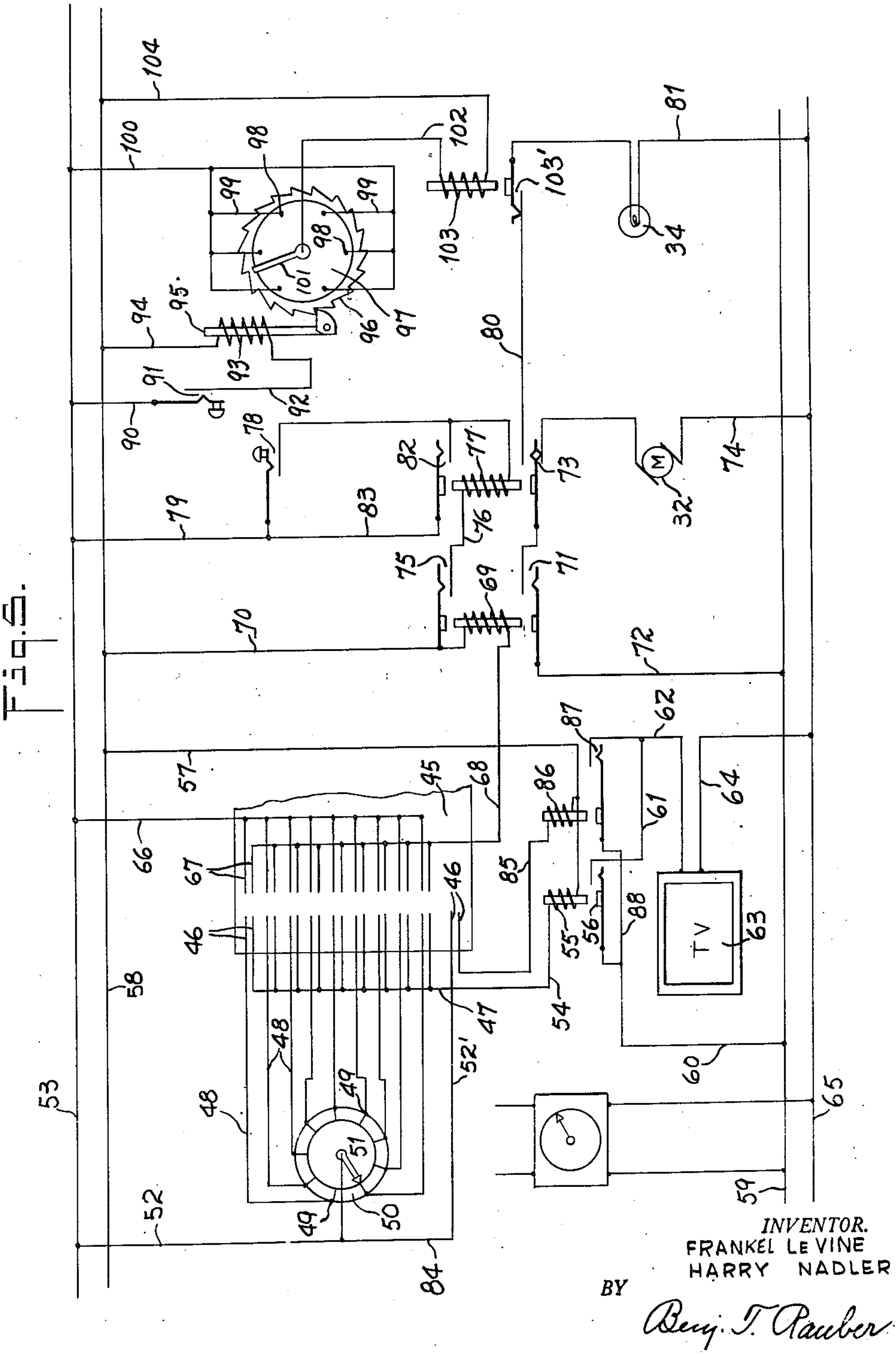
Fig. 5 is a wiring diagram of an electric control system of our invention.

The control system, Figs. 4 and 5, is a timing system in which an electric circuit is timed by a clock 38, Fig. 5 to advance the tape 45 at timed intervals, as for example one-half hour, to advance a contact element which in turn closes an electric circuit from a selected channel control element to the television set to supply electric current thereto and also to a motor to advance the film a distance equal to one frame and to the display light 34. The clock 38 may be of any suitable type but is preferably one which makes one revolution in the time interval, for example, of one-half hour and in each revolution makes and breaks a circuit from the electric power supply through leads 39 and 40 to a solenoid 41, Fig. 4. With each energizing of the solenoid it draws in its armature plunger to which is attached a pivoted pawl 42. The pawl 42 engages a tooth of a ratchet wheel 43 and advances this wheel a distance of one tooth. This operation is repeated each time the clock closes the circuit to the leads 39 and 40. The clock may be equipped to shut down for selected periods as, for example, a twelve hour interval. The ratchet wheel drives a tape drum 44 to advance a tape 45 passing over the drum 44 and a drum 44' parallel to it. This mechanism and the electric circuit are located in the cabinet to the rear of the wall 22. The tape 45 is preferably composed of a non-stretching material. The length of the tape depends upon the distance the tape is moved by the solenoid and the length of time which the tape represents. Thus if the movement of the tape is ⅛ inch with each stroke of the solenoid and the cycle chosen is one week, the tape length is the number of half-hours in a day mutiplied by seven and multiplied by ⅛ inch or 42 inches. A rivet or dome positioned along the width of the tape will cause the closing of a leaf switch 46 which is shown in diagram form in Fig. 4 as a four pole, single throw, two circuit switch. Such a switch is satisfactory for a low voltage circuit.

There are numerous equivalent means for obtaining the electrical circuits. If the drum is segmented by discs of conducting material and alternate discs of insulating material the desired contacts may be obtained by punching holes in the tape. The tape 45 having considerable width allows for multiple circuit. According to our invention there should be one more circuit than there are channels for television programs. Thus, if there are nine channels, there should be ten circuits. The circuit for each channel requires two contactors in the arrangement illustrated herein. The drum 44 is provided with sprocket teeth which coincide with holes for the teeth in the tape. These holes in one edge of tape 45 register movement thereof, synchronous with the movement of drum 44.

The electric control system shown in Fig. 5 is controlled by the closing of a circuit through any pair of the contact fingers 46, Fig. 4. In the particular embodiment shown in Fig. 5 there are ten pairs of contact fingers 46 of which each of the first nine are operative for one of nine channels and the tenth is operative for all of the nine channels. One contact finger of each of the first nine pairs is connected to a common lead or bus bar 47. Each of the other fingers of each pair is connected through an individual lead 48 to an individual insulated terminal 49 of a commutator ring 50. The commutator is provided with a rotatable contact arm 51 connected by a lead or main 52 to a main 53 of a source of low potential electric energy. The contact arm 51 rotates with the control of the television set so that each contact 49 corresponds with a setting of the radio set for one of the television channels. Accordingly for each channel selected by the commutator one pair only of the pairs of contacts 46 will be connected to the main 53. If the commutator is set for a sponsor's channel at the time set by the clock 38, the corresponding pair of fingers will be closed by the tape 45 and a circuit will be closed from the main 53 to bus bar 47.

From the bus bar 47 current will then flow through a lead wire 54 to the solenoid 55 of an electromagnet switch 56 closing the switch. The current will return through a return lead 57 to the return main 58 of the source of current which may be a battery or transformer. The closing of switch 56 closes a circuit from a power main 59 and leads 60, 61 and 62 to the television set 63 from which it returns through a return lead 64 to the return main 65. The television set is thereby put into operation on the selected channel.

Low potential current also is drawn from feeder low tension main 53 through line 66 to parallel contactors 67 shown in Fig. 5 as opposed to those connected with the armature 50, but preferably placed together in the four pole, single throw, circuit switch shown in Fig. 4. Current passes through conductor 66, contacts 67, and a line 68 to a solenoid 69 which controls the advance and setting of the film 20 and returns through lead 70 to the return low tension line 58. When solenoid 69 is energized it closes a switch 71 thereby closing the circuit from high tension main 59 through lead 72, a normally closed switch 73 to the film advancing motor 32 from which it returns through lead 74 to main 65. The motor 32 is then set in motion to advance the film.

The solenoid 69 also controls a circuit to stop the motor when a frame has been advanced to viewing position and to illuminate the frame. For this purpose the solenoid 69, when energized, closes a switch 75 in a lead wire 76 from the line 70 and low tension main 53 to a second solenoid 77, thence through a limit switch 78 which is normally open but is closed by one of the rivets 33 on the film, for example, when the frame reaches its proper position for viewing. From the limit switch 78 the circuit returns through a return lead 79 to the return low tension main 53.

When the switch 78 is closed the solenoid 77 is energized and opens the circuit through the leads 72—73 and motor 32. At the same time the switch 73, which is a double throw switch, closes a circuit from the lead 72 through a lead 80 to the lamp 34 and return wire 81 to the main 65 thus providing illumination for the frame of the film in view position. To insure that the current will continue through the solenoid 77 even though the switch 78 should be opened, the solenoid 77 closes a switch 82 in a by-pass circuit 83 from the leads 76—70 to the return lead 79.

The above circuit will continue closed until the period set as, for example, one-half hour, whereupon the clock 38 moves the tape 45 to a new position and another of the pairs of contacts 46 is closed, whereupon the cycle is repeated. The next cycle may be on the same channel or on a different channel, depending upon which channel the next sponsor has sponsored.

Whenever any time interval is taken by a sponsor for a particular channel, only that channel can be shown in the television set as the circuits corresponding to all other channels are broken by the tape 45. However an auxiliary circuit is provided when no channel is taken for any time interval. This is provided for by the tenth pair of the contact fingers 46. One of the fingers of this pair is connected by a lead wire 84 to the line 52 and low tension main 53 while the other is connected by a lead 85 to a solenoid 86 which is connected to the return line 57. The solenoid when energized closes a switch 87 in a by-pass circuit through a lead 88 from the lead 60 to the lead 62 to the television set 63. In this situation the television set may be operated on any of the channels and the film motor and illumination circuits are open and inoperative.

It may be noted that if the user should tune in the active channel, then turn to an inactive channel and back to the active channel, only the circuits 46 would be affected and the motor 32 would not be started and stopped as it is controlled by circuits 67.

Normally the clock 38 and the tape 45 and film 20 are arranged for a complete week. In the event that a sponsor's program is set for a bi-weekly schedule the apparatus may be provided with an additional circuit by which the illumination of the sponsor's film frame is omitted or skipped in alternate weeks. This is accomplished by adding a pair of rivets 89 to the film 20 near its lower edge, one at the beginning and one at the end of the frame in a position at which they will successively operate a switch mechanism of an additional circuit which will in alternate weeks open and close a switch in the lamp circuit. This is shown in Fig. 5.

The circuit shown in Fig. 5 for cutting out alternate weeks of a sponsor's advertisement when he has no program on the air, is accomplished by breaking the circuit to the illumination. For this purpose a stepping relay is actuated by the first rivet 89 in the film as the frame in question moves into position. This closes a circuit which energizes a relay switch to break the illumination for the advertisement. As the frame leaves, the second rivet 89, activates the stepping relay to an open circuit position. The following week the film rivet again activates the stepping relay but this is a closed circuit so that the advertising appears, due to the illumination. As the film moves away from the window 11 the stepping switch moves again to an open circuit position. Thus every fourth movement by the stepping switch provides a closed circuit position which prevents viewing the advertisement by closing the circuit to the illumination.

In the particular skip-circuit illustrated a branch 90 leads from the low tension main 53 to a switch 91 which is closed when the rivets 89 or other actuating device comes into place and thereby establishes a circuit through the branch 90, switch 91 and a lead 92 to a solenoid 93 and thence returning by a return branch 94 to the return main 58. With each closing of the switch 91 the solenoid 93 draws upwardly a core or armature 95 having a hooked end that engages a ratchet wheel 96. The ratchet wheel 96 is rotatably mounted relative to an insulating base 97 having a series of contacts 98 spaced equiangularly about the center of the ratchet and each connected through branch wires 99 to the branch 100 and main 53.

Secured to the ratchet wheel 96 and rotatable thereby is a rotating contact terminal 101 which is in turn connected through a lead 102 to a solenoid 103 which controls the switch 103' in respective lead 80. The solenoid is connected to the main 58 by a lead 104. With each actuation of the ratchet wheel by the core or armature 95 the contact 101 is rotated one-quarter the distance between the contact points 98 so that in one actuation of the ratchet the contact arm 101 will swing from contact with one contact terminal 98 to a position one-quarter of the distance between this contact and the next succeeding one and after three more movements of the solenoid will swing into contact with the next succeeding contact terminal to close the circuit. Accordingly, with each four movements of the solenoid 86 through the closing of the switch 84 by the appropriate contact rivets the circuit will be opened and closed through the solenoid 103 and, correspondingly, the circuit through the appropriate lead 80 will be opened and closed.

It will be apparent, therefore, that when the tape is set for one cycle or rotation per week this particular circuit will be opened and closed in alternate weeks and, accordingly, the solenoid 93 will for this contact and the next succeeding one and after three more movements of the solenoid will swing into contact with the next succeeding contact terminal to close the circuit. Accordingly, with each four movements of the solenoid 86 through the closing of the switch 91 by the appropriate contact rivets the circuit will be opened and closed through the solenoid 93 and, correspondingly the circuit through the lead 80 will be opened and closed.

It will be apparent, therefore, that when the tape is set for one cycle or rotation per week this particular circuit will be opened and closed in alternate weeks and, accordingly, the solenoid 94 will for this particular circuit be energized only on alternate weeks. The film motor will advance the sponsor's frame each week but for those alternate weeks for which space is not engaged the display light will not be lighted. When the next sponsor's program comes on the motor 32 will rotate one frame bringing the correct frame into position and then illuminating it in the manner described above.

Figure 6:
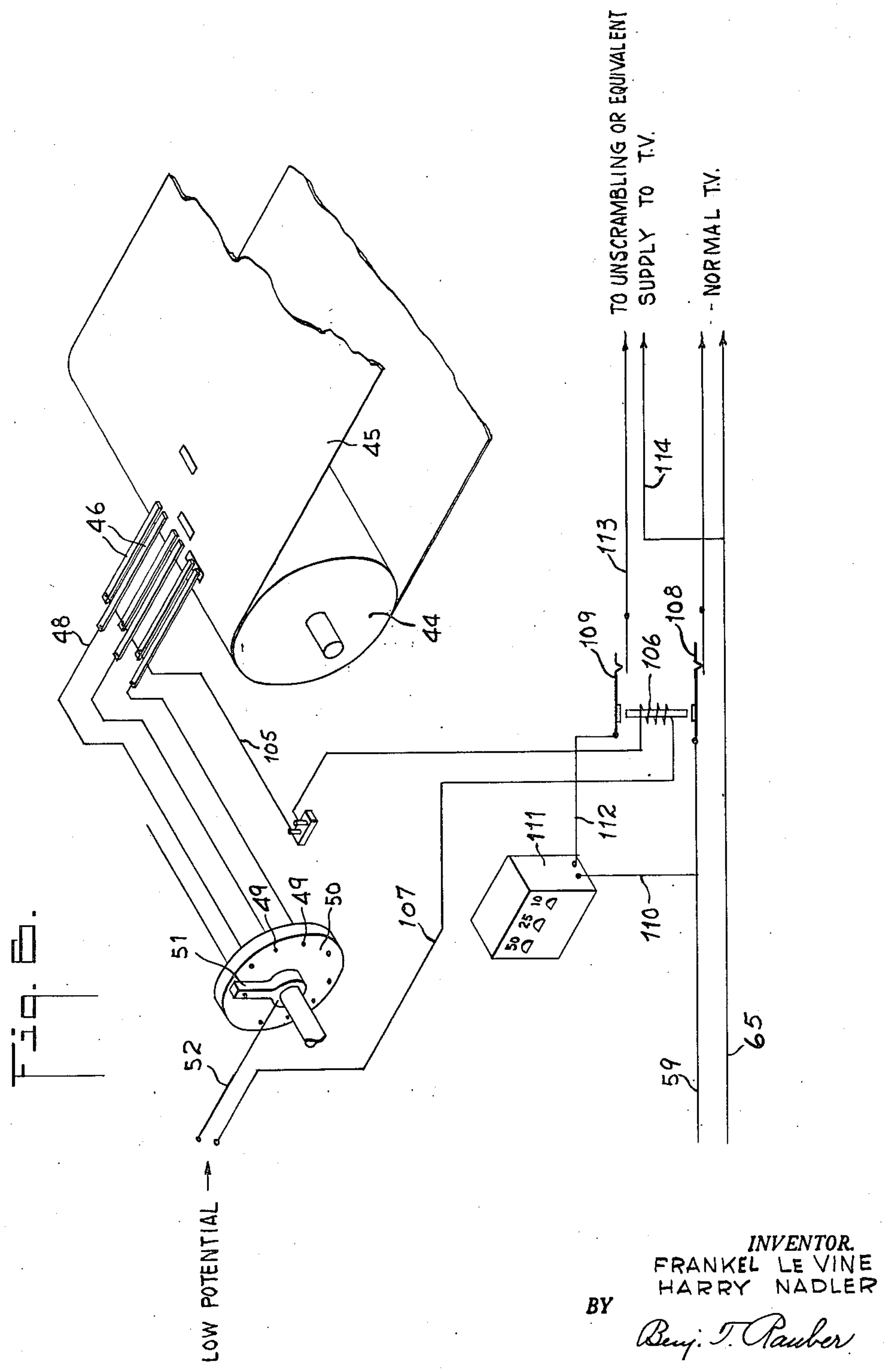
Fig. 6 is a portion of the wiring diagram modified to show a further application of the invention.

Fig. 6 illustrates another application of the invention. In this application the circuits controlled by the tape 45 and the contact fingers 46 are used to control circuits through channels in which television circuits are scrambled so that they may be viewed only through an arrangement which will unscramble them and permit the program to be viewed on television. These controlled circuits may also comprise a coin box arrangement which will permit the unscrambled apparatus to operate only upon depositing the proper coin.

In this embodiment of the invention one of each pair of contact fingers is connected to a common lead wire 105 leading to one terminal of a solenoid 106 while the other finger of each pair is connected through the leads 48 to the terminals 49 of the station-selector 50, as in Fig. 5. With this arrangement current is led from the main 52 to the rotating arm 51, as in Fig. 5, thence to the terminal corresponding to the particular channel which is to be viewed, thence through the lead wires 48, thence to the opposite finger and the lead 105 and thence to the solenoid 106. The opposite end of the solenoid is connected to the return main 107.

Normally when contact is not made through any of the fingers 46, energy is supplied from the power main 59 through a normally closed switch 108 to the television apparatus and returns to the main 65. However, when the solenoid 106 is energized the switch 108 is opened breaking the normal circuit to the television, and second switch 109 is closed. When switch 108 is opened and switch 109 is closed energy may be supplied through a branch 110 from the main 59 through a coin box 111, thence through a lead 112 and the switch 109 to lead 113 to the unscrambling or equivalent mechanism of the television. From the unscrambling mechanism the current then passes through a lead 114 to the main 65.

The coin box 111 may be of any known type in which a circuit is closed upon depositing the proper coin or coins. Through this mechanism any selected circuit on which a special scrambled program is given may be closed as an alternative to the normal television circuit. It will be understood that this type of circuit may be used wherever it is desirable to limit or restrict the television to particular channels at specified time intervals.

The rotation of the control tape 45 will be accomplished by means of a timing clock as described above.

It should be understood that by carrying the separate leads from contact switches 46 to the coin box 111 there may be provided series of circuits which call for different values of coins to be deposited. Thus the common conductor 105 would be replaced by multiple conductors each of which would represent a different charge for the program presented. Such a circuiting would not require passage through the station selector 50. Lead 52 would be common to all contacts 46.

Figure 7:
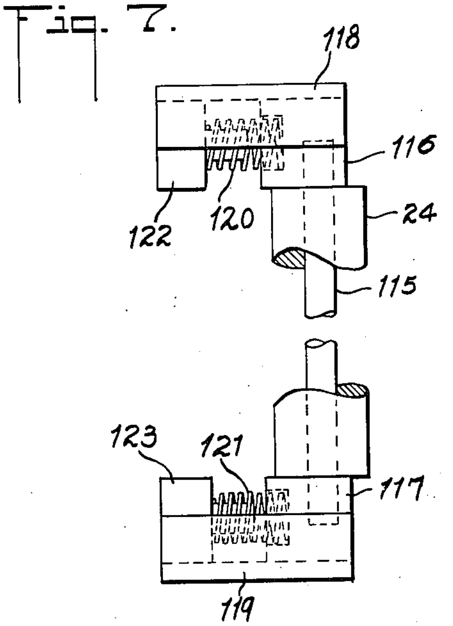
Fig. 7 is a detail of a means for mounting a pressure roller for the film advancing mechanism.

Fig. 7 illustrates, by way of example, a detail of a mounting for the pressure rollers 24 and 27. This mounting comprises a shaft 115 fixed to the roller 24 or 27 and journalled in bearings 116 and 117 slidable transversely of the axis of the shaft in fixed guides 118 and 119 respectively at the top and bottom of the cabinet 10. Springs 120 and 121 confined between fixed blocks 122 and 123 and bearings 116 and 117 respectively press the shaft 115 and the roller 24 or 27 into pressure contact with the film 20 on their respective rollers 23 and 26. This construction is merely illustrative and many other types of pressure roller mountings may be used.

Figure 8:
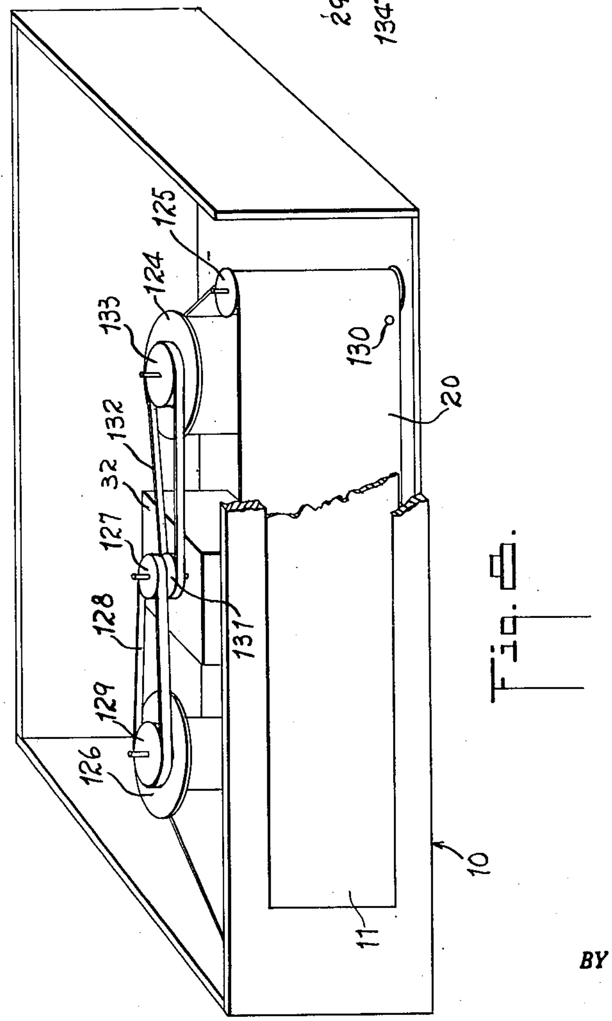
Fig. 8 is a view similar to Fig. 2 of a modification of the film advancing mechanism.

Fig. 8 illustrates a modified film feeding arrangement. In this modification the film is not endless. The film is initially wound on a supply reel 124. Film is then drawn from the reel and threaded about a guide roller 125 then behind the window 11, thence around a second guide roller (not shown) and onto a second wind-up reel 126. The motor 32, preferably a shaded pole motor, drives the wind-up reel 126 through a sprocket wheel or pulley 127 on the delivery shaft of the motor or a transmission driven by it, a chain or belt 128 and a sprocket wheel or pulley 129 secured on the shaft of the wind-up roller. When the last frame is brought behind the window 11 a further slight movement of the film will bring a contact member or rivet 130 on the film into contact with a reversing switch or mechanism (not shown) to reverse the motor. The rivet 130 is not in line with the rivets 33 and therefore does not affect their operation.

When the motor reverses it disengages the sprocket or pulley 127 from the drive shaft of the motor assembly by any suitable type of disengaging clutch and engages the drive shaft with a second sprocket or pulley 131, which in turn drives a belt or chain 132 and a pulley or sprocket 133 fixed on the shaft of the supply reel 124. The film is then rewound on the supply reel, the wind-up reel 128 rotating freely in reverse until the film has been placed in its original position whereupon the motor is restored to forward drive by a suitably placed rivet and the film is ready for a succeeding cycle. It will be understood that the transmission shown is merely by way of example and that other transmissions may be used.

Figure 9:
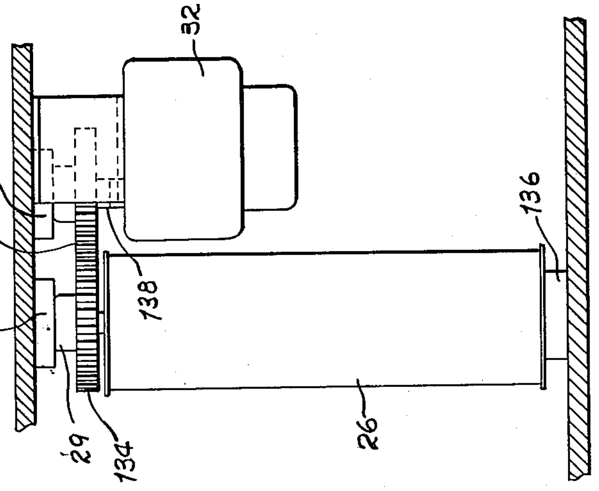
Fig. 9 is an elevation of a drive mechanism for the film advancing mechanism.

Fig. 9 illustrates a detail of a motor drive such as that used in Fig. 2. In this drive a spur gear 134 is fixed on the shaft 29 of the roller 26, the ends of the shaft 29 being journalled in an upper bearing 135 and a lower bearing 136. The spur gear 134 meshes with a gear 137 fixed on the drive shaft 138 of the motor 32, the upper end of the shaft being journalled in a bearing 139 supported from the top of the housing 10.

In the invention illustrated above, we have provided an apparatus by means of which the use of the television set may be restricted to predetermined channels at predetermined time intervals. It may be used to this end for any desired purpose, such as those described above. Utilizing the invention, the apparatus may be arranged as described in combination with suitably timed advertisements of sponsors, in combination with scrambled circuits with pay systems or with other special apparatus, or to restrict the television set to certain channels at certain times and thus to limit the programs that may be viewed.

Having described our invention, what we claim is:

1. Apparatus for use with a television set which comprises a television control circuit to control the supply of electric energy to a television set, said circuit comprising pairs of switch terminals, a timing element to move a selected one of said pairs of switch terminals into contact at successive time periods to close said circuit therethrough, a tuning element to tune the television set to selected channels, and a switch operable by said tuning element to connect a source of electric energy to a selected pair of said switch terminals corresponding with the channel to which the set is tuned.

2. The apparatus of claim 1 in which one of the terminals of each pair is connected directly to a source of electric energy.

3. The apparatus of claim 1 having a travelling timing belt having spaced actuating elements for said pairs of switch terminals and in which said pairs of switch terminals are spaced transversely of the path of travel of said belt to contact said elements in longitudinally spaced succession.

4. The apparatus of claim 3 in which the timing element comprises a clock mechanism and a ratchet, and a pawl drive to move said belt by a step by step motion at fixed time intervals.

5. The apparatus of claim 4 having an electric circuit timed by said clock and comprising an electromagnetic means to actuate said ratchet and pawl mechanism.

6. The apparatus of claim 1 having an electric power circuit to said television set and an electromagnetic control switch for said power circuit having the electromagnet thereof in said control circuit.

7. The apparatus of claim 6 having advertising film pulleys to support said film, an electric motor to rotate said pulleys, an electric lamp to illuminate said film, a power circuit for said motor and lamp having first and second electromagnetic switches in parallel, one of said switches being controlled by the control circuit, a second control circuit comprising the electromagnet of said second switch and having a switch controlled by the electromagnet of the first power switch and a second limit switch controlled by said film and a shunt circuit about said limit switch and held closed by the electromagnet of said first power switch.

8. The apparatus of claim 7 in which said second power switch is a double throw switch to close a branch through said lamp and to open the circuit to the motor when energized.

9. The apparatus of claim 7 having a starting switch in said second control circuit, an electromagnet shunted about said starting switch and a switch in series with said starting switch and movable alternatively to open and to closed position with successive closing and opening of said switch.

10. The apparatus of claim 1 having a power circuit for the television set, said power circuit having two branches one for normal power supply and the other for a scrambled circuit, a coin box switch in series with said scrambled circuit and an electromagnetic switch operable by one of said control circuits to open one of said branch power circuits and close the other one.

11. The apparatus of claim 7 having a switch controlled by said film in the second control circuit, a shunt circuit about said film controlled switch, an electromagnet in series with said switch and said shunt circuit that operates a single pole double throw high tension switch controlling power to the motor and light.

12. The apparatus of claim 7 having a switch in the circuit to said light, said switch controlled by an electromagnet, the circuit for said electromagnet passing through a stepping relay in which every fourth contact is a closed circuit in series with said electromagnet, the magnetic operator of said stepping relay in series with a switch that is actuated by movement of said film.

13. The apparatus of claim 7 having a series of contact terminals spaced about a center, a contact arm carrying a contact terminal and rotatable about said center relatively to said spaced terminals to contact them successively and in which said means comprises a ratchet wheel and a pawl electrically operated by the opening and closing of said branch circuit to move said contact arm half the distance between said spaced contacts.

14. The apparatus of claim 7 having pressure rollers and resilient means to press said rollers into pressure contact with film on said pulleys.

15. The apparatus of claim 7 having a pair of film supporting reels, a driving motor to drive said reels and a reversing means to drive said reels alternatively from said motor.

16. Control apparatus for a television set having a station selector and comprising a pair of contact circuits each having corresponding pairs of contacts in parallel, a timing mechanism to close the switch contacts of a selected pair of each circuit at one of a series of successive time intervals, the first of said circuits comprising a power control switch for the supply of electric power to the television set, a selector switch having a series of contacts each connected in parallel with the other to a corresponding contact of said pairs and having a contact movable in synchronism with the station selector to one of said series of contacts to connect the pairs of contacts individually to said power control switch as said selector switch is moved from one station of said station selector to another, a movable film having a succession of illustrated frames and a contact element for each frame, a circuit comprising an electric motor to move said film at the second control circuit comprising a starting switch to close said motor circuit upon closing one of said pairs of contacts, and a stopping circuit operated by one of said contact elements of said film and a stopping switch to open said motor circuit.

17. The control apparatus of claim 15 having a circuit comprising a lamp to illuminate said frame and a light switch closed by said stopping circuit when said stopping switch is opened.

18. The control apparatus of claim 16 in which said stopping switch and said light switch comprise a double throw switch operated by a common electromagnet in said stopping circuit.

19. The control apparatus of claim 16 having a second series of contacts one at each end of each frame, a skip circuit having a branch comprising a switch open and closed by the contacts of said second series on said film and an electromagnetically operated pawl, and a second branch comprising successive series of contacts and intervening intervals and a switch movable one step by each actuation of said pawl with four steps for each series to open and close said circuit through one of said steps and a control switch in said circuit to open said lamp circuit in one of said steps.

20. The control apparatus of claim 18 in which said switch is in contact with each successive contact for one step in each series of steps.

21. Control apparatus for a television set having a station selector and comprising a direct circuit from a power source to said television set and comprising a switch, a branch circuit from said power source to said television and comprising in series a magnetically controlled switch, a coin controlled switch and an unscrambling means, at least one control circuit having in series a first pair of contacts, a second pair of contacts operated by the station selector to close when said selector is turned to tune in one channel and an electromagnet positioned to close alternatively the switch in said direct power circuit or the magnetically controlled switch in said branch power circuit as said first pair of contacts is closed or opened.

22. The control apparatus of claim 19 in which said timer comprises an endless belt and a means for driving said belt step by step and contact closing means one for contacts of each control circuit.

No references cited.